United States Patent [19]
Harney et al.

[11] Patent Number: 5,640,528
[45] Date of Patent: Jun. 17, 1997

[54] METHOD AND APPARATUS FOR TRANSLATING ADDRESSES USING MASK AND REPLACEMENT VALUE REGISTERS

[75] Inventors: Kevin Harney, Brooklyn, N.Y.; David L. Sprague, Gilbert, Ariz.

[73] Assignee: Intel Corporation, Santa Clara, Calif.

[21] Appl. No.: 469,798

[22] Filed: Jun. 6, 1995

Related U.S. Application Data

[63] Continuation of Ser. No. 999,046, Dec. 31, 1992, abandoned, which is a continuation-in-part of Ser. No. 926,742, Aug. 6, 1992, abandoned, which is a continuation-in-part of Ser. No. 782,332, Oct. 24, 1991, Pat. No. 5,361,370.

[51] Int. Cl.$^6$ .............................. G06F 12/10; G06F 12/00
[52] U.S. Cl. .................... 395/416; 395/421.1; 395/411; 395/308
[58] Field of Search .................... 395/115, 116, 395/164, 166, 402, 405, 406, 411, 412, 413, 416, 418, 419, 421.11, 481, 306, 308, 309, 375, 421.1; 345/185, 189, 190, 191, 200, 201

[56] References Cited

U.S. PATENT DOCUMENTS

| | | | |
|---|---|---|---|
| 4,800,489 | 1/1989 | Moyer et al. | 395/416 |
| 4,860,192 | 8/1989 | Sachs et al. | 395/403 |
| 4,920,483 | 4/1990 | Pogue et al. | 395/421.09 |
| 5,282,274 | 1/1994 | Liu | 395/416 |

*Primary Examiner*—Glenn Gossage
*Attorney, Agent, or Firm*—William H. Murray; N. Stephan Kinsella

[57] ABSTRACT

A method and apparatus for translating a first address in a first address space, such as a processor address space, to a second address in a second address space, such as a system address space, are described. Data alignment signal determinations based on comparisons between destination and source addresses permit automatic replacement of virtual addresses with actual physical addresses to permit direct data transfer between devices. In one embodiment, the apparatus for translating comprises a processor; a page table having a mask register, a comparison value register, and a replacement value register; and a comparator coupled to the comparison value register and to the replacement value register. A programmable mask within the translation mask register is employed to partition a virtual address. A first subaddress comprises a subset of the bits of the first address and a second subaddress comprises remaining bits of the first address. The first subaddress is masked with a programmable mask value in the translation mask register and is compared by the comparator with successive comparison values in the comparison value register until a match comparison value is found. A programmable replacement value in the replacement value register corresponding to the match comparison value is concatenated with the second subaddress. The programmable replacement values, which correspond to programable map windows, permit the programmable mapping of virtual addresses into different predetermined regions of system virtual address space.

16 Claims, 8 Drawing Sheets

METHOD AND APPARATUS FOR TRANSLATING ADDRESSES USING MASK AND REPLACEMENT VALUE REGISTERS

This application is a continuation of U.S. patent application Ser. No. 07/999,046, filed on Dec. 31, 1992, now abandoned, which is a continuation-in-part of U.S. patent application Ser. No. 07/926,742, filed on Aug. 6, 1992, now abandoned, which is a continuation-in-part of U.S. patent application Ser. No. 07/782,332, filed on Oct. 24, 1991, now U.S. Pat. No. 5,361,370.

FIELD OF THE INVENTION

This invention relates to video processing devices and in particular to accessing differing memories within such devices.

BACKGROUND ART

Two types of video processors which may access both system and local memory are well known in the prior art. It is well known in the prior art to use multiple-instruction multiple data (MIMD) systems in this manner. In a multiple-instruction multiple-data execution of an algorithm, each processor of the video signal processor may be assigned a different block of image data to transform. It is also known in the prior art to provide single-instruction multiple-data (SIMD) architecture. Single-instruction, multiple-data is a restricted style of parallel processing lying somewhere between traditional sequential execution and multiple-instruction multiple-data architecture having interconnected collections of independent processors. In the single-instruction, multiple-data model, each of the processing elements or datapaths of an array of processing elements or datapaths executes the same instruction in lock-step synchronism. Parallelism is obtained by having each datapath perform the same operation on a different set of data. In contrast to the multiple-instruction, multiple-data architecture, only one program must be developed and executed.

A conventional single-instruction multiple-data system may include a controller, a global memory and execution datapaths, although data transfers between the datapaths and system memory may be quite complex. A respective execution unit memory may be provided within each execution datapath. Single-instruction multiple-data architecture performs as a family of video signal processors united by a single programming model.

Single-instruction multiple-data architecture may be scaled to an arbitrary number n of execution datapaths provided that all execution datapaths synchronously execute the same instructions in parallel. In the optimum case, the throughput of single-instruction multiple-data architecture may theoretically be n times the throughput of a single processor when the n execution datapaths operate synchronously with each other. Thus, in the optimum case, the execution time of an application may be reduced in direct proportion to the number n of execution datapaths provided within single-instruction multiple-data architecture. However, because of overhead in the use of execution datapaths, this optimum is never reached.

Single-instruction multiple-data architecture works best when executing an algorithm which repeats the same sequence of operations on several independent sets of highly parallel data. For example, for a typical image transform in the field of video image processing, there are no data dependencies among the various block transforms. Each block transform may be computed independently of the others.

Thus, the same sequence of instructions from instruction memory may be executed in each execution datapath. These same instructions may be applied to all execution datapaths by way of an instruction broadcast line and execution may be independent of the data processed in each execution datapath.

A problem with systems such as prior art single-instruction multiple-data architecture is in the area of input/output processing. Even in conventional single processor architecture a single block read instruction may take a long period of time to process because memory blocks may comprise a large amount of data in video image processing applications. However, this problem is compounded when there is a block transfer for each enabled execution datapath of the architecture and the datapaths must compete for access to global memory. For example, arbitration overhead may be very time consuming. This is further complicated when there is communication between the execution datapaths and a number of devices in system memory space.

The alternative of providing each execution datapath with independent access to external memory is impractical for semiconductor implementation. Furthermore, this alternative restricts the programming model so that data is not shared between datapaths. Thus, further inefficiency results due to the suspension of processing of instructions until all the block reads are completed. This may be seen in the discrete cosine transform image kernel of Table I:

TABLE I

```
for (i = 0; i < NUMBEROFBLOCKS; i = i + 4) {
    k = i + THIS-DP-NUMBER;
    read block(original_image[k],temp_block);
    DCT-Flock(temp_block);
    write block(xform image[k], temp_block);
};
```

The read_block and write_block routines of the instruction sequence of Table I must be suspensive; i.e., each routine must be completed before the next operation in the kernel is performed. For example, read_block fills temp_block in execution unit memory with all of its local values. These local values are then used by DCT_block to perform a discrete cosine transform upon the data in temp_block. Execution of the discrete cosine transform must wait for all of the reads of the read_block command of all execution datapaths to be completed. Only then can the DCT_block and write_block occur. Thus, by the ordering rules above, read_block must be completed before the write_block is processed or the DCT_block is executed.

The requirements imposed by the ordering rules within single-instruction multiple-data architecture result in the sequentialization of memory transactions and processing. For example, a first memory read_block time segment of an execution datapath must be completed before processing of DCT_block time segment may begin. Processing of the DCT_block time segment must be completed before the memory write_block time segment may begin. Only when the memory write_block time segment is complete can a second memory read_block time segment begin. Thus, execution and access by a second execution datapath is then sequentialized as described above for the first execution datapath.

Similar requirements occur in high performance disk input/output as well. In a typical disk input/output operation, an application may require a transfer from disk while continuing to process. When the data from disk are actually needed, the application may synchronize on the completion of the transfer. often, such an application is designed to be a multibuffered program. In a multibuffered program, data from one buffer is processed while the other buffer is being filled or emptied by a concurrent disk transfer. In a well designed system, the input/output time is completely hidden. If not, the execution core of single-instruction multiple-data architecture is wait-stated until the data becomes available. This causes further degrading of the performance of the single-instruction multiple-data architecture.

A system addressing some of these problems is taught in "Architecture for Video Signal Processing", U.S. patent application Ser. No. 07/782,332 filed Oct. 24, 1991 by Sprague et al, now U.S. Pat. No. 5,361,370. In the system of Sprague, et al., a single-instruction, multiple-data image processing system is provided for more efficiently using parallel datapaths when executing an instruction sequence having conditionals and greatly improved external memory access. Each datapath of the Sprague et al. image processing system has an execution unit and a local memory. Access between the execution unit and the local memory is by way of one port of a dual-ported local memory.

In this system, all transfers between the local memory and the system memory take place using the second port of the dual-ported local memory. The transfers between system and local memories are scheduled and controlled by a common unit called the block transfer controller. The block transfer controller, along with the dedicated port of the dual-ported local memory, permit each access to global memory by a datapath to be overlapped with its instruction processing. This is useful in preventing stalling of the processor. Thus the system of Sprague et al. solved several problems associated with the single-instruction, multiple-data architecture. However, it did not solve all of the problems related to transfer of data between the processor and both local and system memory, along with associated problems relating to interfaces and interrupts.

SUMMARY OF THE INVENTION

There is provided herein a method and apparatus for translating a first address in a first address space to a second address in a second address space. In one embodiment, the apparatus comprises a processor; a page table having a translation mask register, a comparison value register, and a replacement value register; and a comparator coupled to the comparison value register and to the replacement value register. The first address comprises a first subaddress comprising a subset of the bits of the first address and a second subaddress comprising remaining bits of the first address. The first subaddress masked with a mask value in the mask register is compared by the comparator with successive comparison values in the comparison value register until a match comparison value is found. A replacement value in the replacement value register corresponding to the match comparison value is concatenated with the second subaddress to provide the second address.

DETAILED DESCRIPTION OF THE INVENTION

Figure 1:
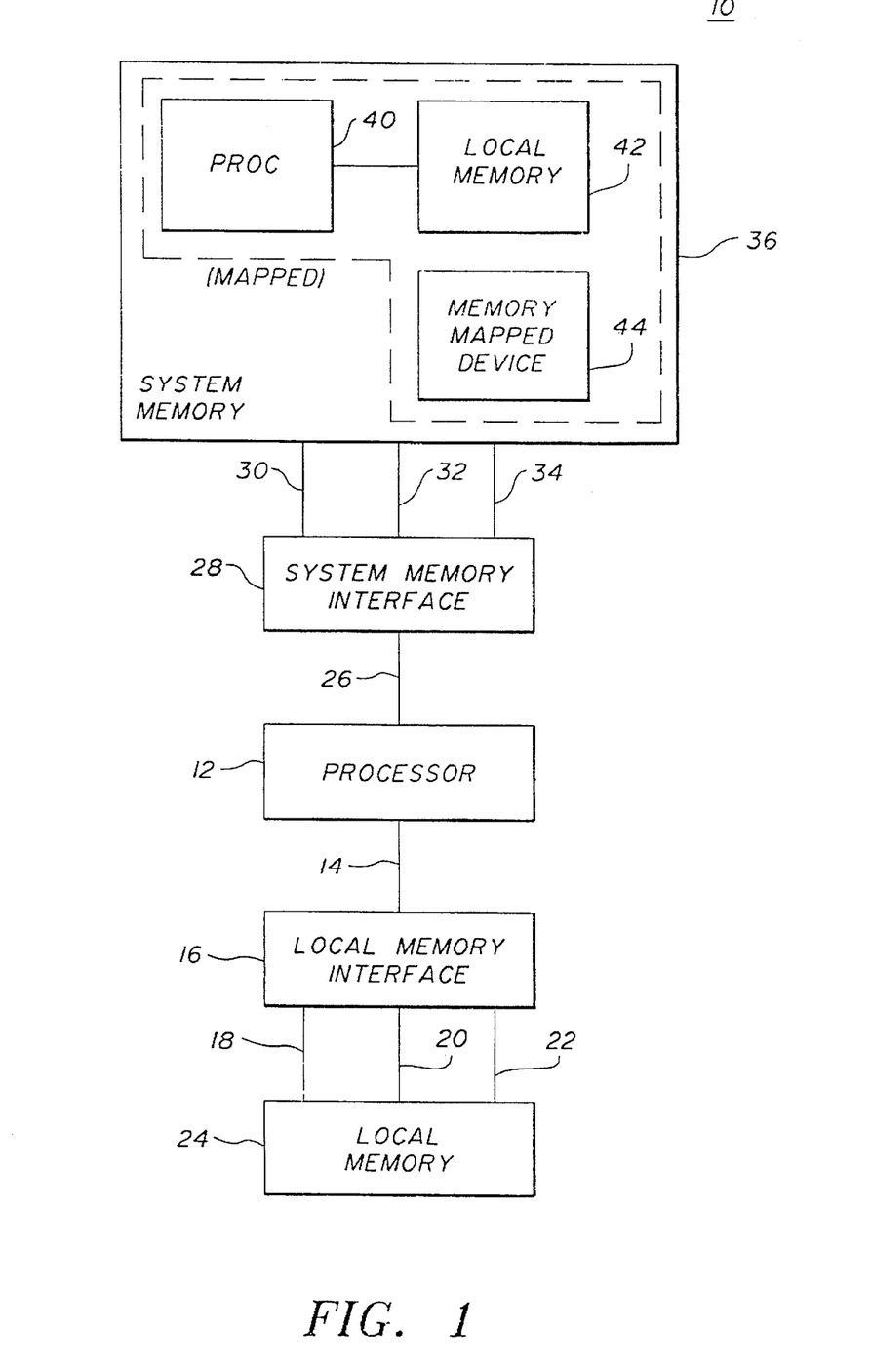
FIG. 1 is a block diagram representation of an interface system of the present invention employing two buses for system and local memory interfaces.

Referring now to FIG. 1, there is shown a two-bus interface system 10 of the present invention having a system processor 12. System processor 12 of two-bus interface system 10 is provided with two separate external interconnect buses 14, 26. External interconnect buses 14, 26 of system processor 12 are connected respectively to local memory interface 16 and system memory interface 28. Local memory interface 16 controls access to local memory 24 which may, for example, be a conventional dynamic random access memory (DRAM) device, a VRAM, a static random access memory (SRAM) or other resource. System memory interface 28 controls access to system memory or resource 36. During a typical memory access cycle, system processor 12 of interface system 10 may access either local memory 24 or system memory 36.

In order to control access to local memory 24 within interface system 10, local memory interface 16 must receive from local memory interconnect bus 14 signals suitable for controlling local memory address bus 18, local-memory data bus 20 and local memory control bus 22. Local memory buses 18, 20, 22, coupled to local memory interface 16, may be conventional buses such as those normally required by a conventional dynamic RAM.

Likewise, system memory interface 28 must receive from system memory interconnect bus 26 signals which are suitable to permit interface 28 to control the buses of system memory 36. These buses include address bus 30, system memory data bus 32 and system memory control bus 34. Buses 30, 32, 34 are the conventional buses required for accessing a conventional system memory such as system memory 36. System memory interconnect bus 26 may be a multiplexed multi-master bus.

It will be understood that any number of devices may be coupled to system memory interconnect bus 26 within two-bus interface system 10 by way of system memory interface 28. For example, memory mapped device 44 may be coupled in this manner. Device 44 may be memory mapped within interface system 10 only for the purpose of permitting access by system processor 12 and may have no memory of its own. Additionally, an additional processor 40 having its own local memory 42 may thus be coupled to system memory interconnect bus 26. Using the system of the present invention, memory mapped device 44 and local memory 42 of system memory 36 may be mapped into the virtual system address space of system processor 12 in addition to system memory 36.

Because system memory interconnect bus 26 may be coupled between system processor 12 and various host devices or peripheral devices such as processor 40 and memory mapped device 44, system memory interconnect bus 26 may be understood to be a peripheral component interface bus. The primary use of system memory interconnect bus 26, i.e., peripheral component interface bus 26, is as a high-performance, low-latency path between system processor 12 and the various host devices or display/capture subsystems which may be coupled to two-bus interface system 10. As one of several devices coupled to peripheral component interface bus 26, system processor 12 may operate as either a master or as a slave in transactions involving peripheral component interface bus 26.

Local memory interface 16 permits external frame buffer controllers (not shown) to communicate dynamic random access memory (DRAM) to sequential or serial access memory (SAM), SRAM and DRAM reads, as well as SAM, SRAM and DRAM to DRAM reads, and page read modes. System processor 12 receives transfer and split phase transfer read and write commands, and then performs the VRAM memory cycle requested. System processor 12 responds to VRAM transfer requests with an acknowledge pulse when the transfer is initiated, typically a small number of clock cycles after the VRAM transfer code is received by system processor 12. VRAM transfer commands have high access priority on local bus 14 compared to any other system processor 12 initiated local memory cycles.

It will be understood that the split phase transfers are those wherein a double buffering technique is used to permit a second block of data to be read while a first block of data is still being processed within system processor 12. Split transfers by system processor 12 may be supported by external logic which monitors control lines of interface system 10 and schedule transfers accordingly. Split transfer capability within interface system 10 allows local memory 16 to be packed more efficiently by eliminating the need to perform precisely timed mid scan line transfer cycles.

Although interface system 10 is shown with a single local memory 24, it will be understood that system processor 12 may support two banks (not shown) of memory on local bus 16. Each of the local memory banks may have four base address pointers associated with it. In addition, each address pointer may have a base address and a dedicated pitch register for doing next address calculations. The eight address pointers of the two banks of local memory 24 are all "write only" by microcode by way of system bus 14.

Information transmitted by way of local memory interface 16 is transmitted and received in command words. The nine bit word commands describe either of two formats which are described in more detail hereinbelow. Various bits in this command word indicate whether the transfer is read or write, which bank of memory is accessed, which of the four associated address pointers is used, and how to perform pitch offset calculations or register loads. Additionally, various bits in the command word may be used to indicate a horizontal line code, frame increment code, or to perform a base pointer copy.

Figure 2:
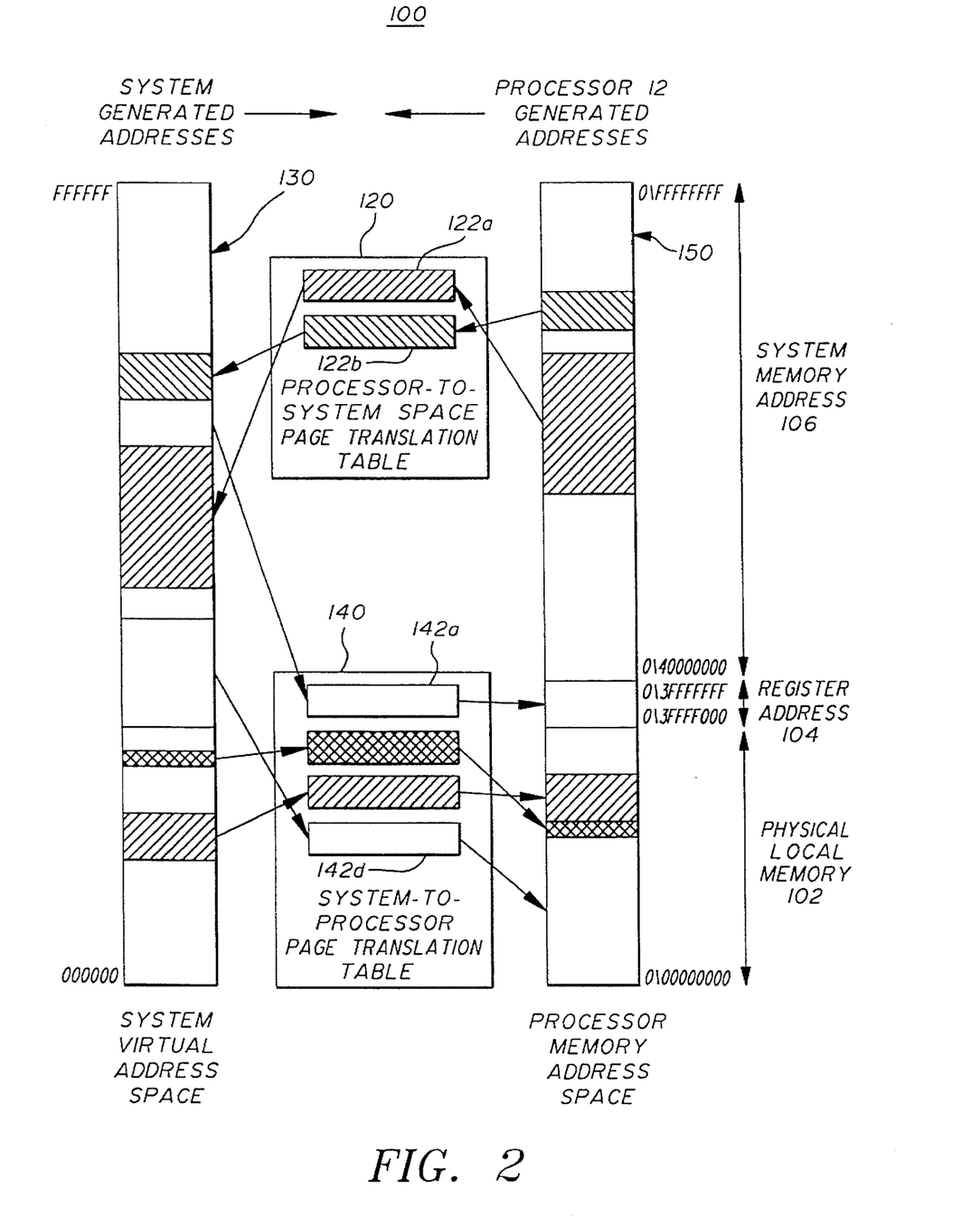
FIG. 2 is a memory model of the apparatus of FIG. 1.

Referring now to FIG. 2, there is shown memory model 100. Memory model 100 represents the mapping of system virtual address space 130 and processor memory address space 150 of system processor 12 within two-bus interface system 10. In order to permit system processor 12 to selectively write a piece of data either (1) into local device 24, or (2) into system memory 36, both resources (24, 36) are mapped into the memory space of system processor 12 as represented by memory model 100. Note that the label "0\" is merely a way to distinguish addresses in system virtual address space 130, which do not contain this prefix, from addresses in processor address space 150, as will be understood by those skilled in the art.

Thus, system processor 12 may generate addresses anywhere in a single, linear four gigabyte address space using microcode, direct memory access or block transfer controller operations. Addresses less than one gigabyte are mapped into local memory 24 or into registers (not shown) within system processor 12. Addresses greater than one gigabyte are mapped, for example, into system memory 36, memory mapped device 44, are local memory 42. Accesses of system memory 36 by system processor 12 use programmable processor-to-system space page translation table 120 in order to map two windows 122a, b into system virtual address space 130. References from system virtual address space 130 to the first gigabyte of processor memory address space 150 are mapped by programmable system-to-processor space page translation table 140 in order to map four windows 142a–d and into local memory 24.

System virtual address space 130 represented by memory model 100 may be large. For example, system address space 130 may be four gigabytes. In the preferred embodiment of two-bus interface system 10, system address space 130 may be mapped into processor memory address space 150 wherein address space 150 has three processor address partitions 102, 104, 106. Within processor memory address space 150, addresses between zero and one gigabyte minus four kilobytes may be mapped into first processor memory partition 102. Memory locations corresponding to first processor memory partition 102 may be located in a physical local memory bank such as local memory 24 which is accessed by way of local memory interface 16.

Second processor memory partition 104, having a size of approximately four kilobytes, may also be reserved within interface system 10. Four kilobyte processor memory partition 104 may preferably be located immediately above first processor memory partition 102 in the last four kilobytes of the first gigabyte of virtual address space 130 of system processor 12. Second processor memory partition 104 may most advantageously be mapped into internal registers (not shown) within system processor 12 of interface system 10. The third processor memory partition within two-bus interface system 10, processor memory partition 106, may have addresses from one gigabyte to four gigabytes. Processor memory partition 106 may reside, for example, in system memory 36 accessed by way of system memory interface 28.

The preferred embodiment of the invention two-bus interface system 10 is provided with virtual addresses of thirty-two bits. These addresses are mapped within memory model 100 by programmable page translation tables 120, 140. Programmable page translation tables 120, 140 may be located within the lower one gigabyte of processor memory address space 150.

In the page translation method of the present invention, programmable map windows 122a, b are defined by a user in processor-to-system space page translation table 120. In this embodiment, windows 122a, b are mapped into programmably selectable regions of system virtual address space 130. A user of interface system 10 may easily change the locations of address space 130 into which system processor 12 generated addresses are mapped by means of programmable map windows 122a, b by changing the programming of map windows 122a, b within processor-to-system space page translation table 120.

Each programmable map window 122a, b of page translation table 120 may be of variable size, from a minimum of four kilobytes to a maximum of one gigabyte. The size of map windows 122a, b can be increased in increments of $2^x$, where x is a positive integer. Map windows 122a, b must not overlap within page translation table 120 or exceed the three gigabytes of physical memory available within system virtual address space 130. If an address generated by system processor 12 does not match an entry in processor-to-system space page translation table 120, it is ignored and a page table fault is issued. A page table fault issued in this manner within two-bus interface system 10 terminates current operations of block transfer controller 368, as described hereinbelow, terminates all scheduled direct memory access operations, and generates an interrupt of system processor 12.

In the page translation method of the present invention programmable map windows 142a–d are defined by a user in system-to-processor space page translation table 140. In this embodiment, map windows 142a–d are mapped into memory partitions 102, 104 of processor memory address space 150 from system virtual address space 130. The locations of address space 150 into which system generated addresses are mapped may be readily changed by changing the programming of programmable map windows 142a–d of system-to-processor space page translation table 140.

Each programmable window 142a–d of system-to-processor space page translation table 140 may be of variable size, from a minimum of four kilobytes up to a maximum of one gigabyte, in increments of $2^x$, where x is a positive integer. Windows 142a–d must not overlap within page translation table 140 or exceed the one gigabyte of physical memory corresponding to processor memory partitions 102, 104. If a system generated address does not match an entry in system-to-processor space page translation table 140, it is ignored and a page table fault is issued. A page table fault in two-bus interface system 10 terminates current operations of block transfer controller 368, as described hereinbelow, terminates all scheduled direct memory access operations, and generates an interrupt of system processor 12.

Figure 3:
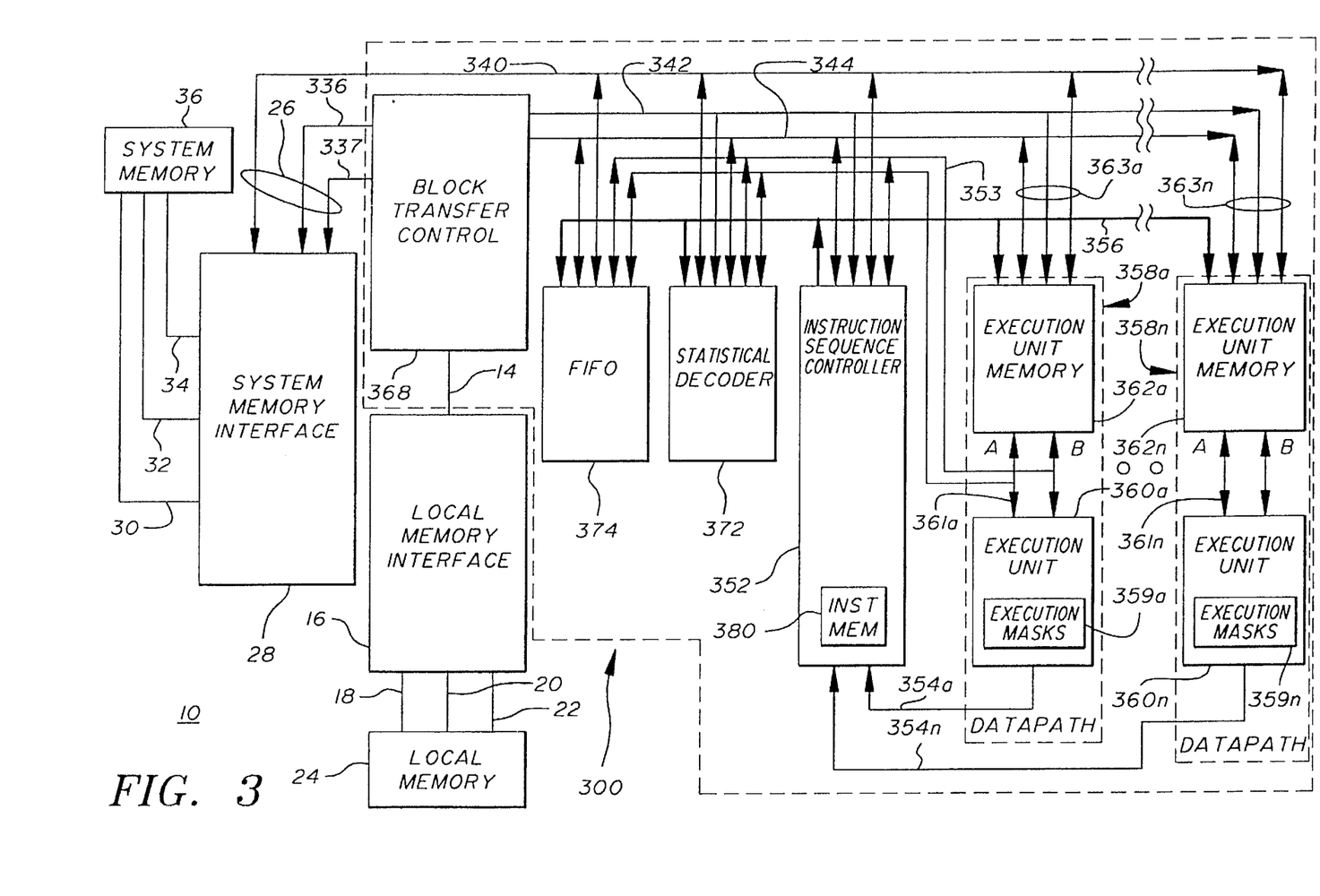
FIG. 3 is a more detailed block diagram representation of the two-bus interface system of FIG. 1.

Referring now to FIG. 3, there is shown two-bus interface system 10 including a block diagram representation of single-instruction multiple-data architecture image processor 300. While here image processor 300 is used to perform the functions of system processor 12, it will be understood that processors other than single-instruction multiple-data architecture image processor 300 may be used within two-bus interface system 10. A processor such as image processor 300 is taught in parent U.S. patent application Ser. No. 07/782,332, filed by Sprague et al. on Oct. 24, 1991, now U.S. Pat. No. 5,361,370, which is incorporated by reference herein.

Each execution datapath 358a–n of single-instruction multiple-data image processor 300 is provided with a respective execution unit 360a–n and execution unit memory 362a–n. Each of the execution units 360a–n is coupled to its respective execution unit memory 362a–n by way of a respective port 361a–n and to local memory 24 and system memory 36 by way of a respective port 363a–n. Ports 361a–n and ports 363a–n, together, provide each execution datapath 358a–n with a dual port architecture to permit each execution unit 360a–n to access its respective execution unit memory 362a–n at the same time that data is being transferred between execution unit memories 362a–n and local memory interface 16 or system memory interface 28. It will be understood that within the dual port architecture of image processor 300, no execution unit 360a–n may directly access any execution unit memory 362a–n except its own.

During execution of instructions, instruction sequence controller 352 of single-instruction multiple-data image processor 300 simultaneously applies the same instruction to every execution data-path 358a–n by way of broadcast instruction line 356. The instructions applied by sequence controller 352 may, for example, be previously stored in system memory 36. The instructions received by sequence controller 352 are applied to sequence controller 352 by way of line 340.

Within image processor 300, conditional execution permits each datapath 358a–n to execute or not execute a particular issued instruction depending on the state of the local datapath condition flag. Hardware execution masks 359a–n, residing within execution units 360a–n of image processor 300, permit individual datapaths 358a–n to turn off execution of a sequence of issued instructions for an arbitrary period of time. These two mechanisms decrease the amount of wait stating or idling of execution datapaths 360a–n within single-instruction multiple-data architecture image processor 300, thereby permitting more efficient use of execution datapaths 358a–n.

Control over whether an instruction issued by instruction sequence controller 352 is executed or ignored by an individual execution datapath 358a–n is required for "data-dependent" computation (which includes different algorithms for different data as a function of the nature of the data) in a single-instruction multiple-data architecture such as the architecture of image processor 300. It is required because each execution datapath 358a–n may have a different value when a test is performed as part of a conditional branch. Thus, each execution datapath 358a–n within image processor 300 of the present invention is provided with individual datapath execution masks.

It is equally important to control the sequence of instructions provided by sequence controller 352 to execution datapaths 358a–n by way of broadcast instruction line 356. This control is essential for loops and may also be used to optimize data-dependent execution wherein no execution datapath 358a–n is required to execute a conditional sequence of instructions.

For the purpose of executing a conditional branch within image processing architecture 300, each datapath 358a–n tests the condition of a conditional branch and independently sets its own flags according to its own local determination. Signals representative of these flags are applied by each execution datapath 358a–n to instruction sequence controller 352 by way of flag lines 354a–n.

Rather than automatically wait-stating all execution datapaths 358a–n during a conditional branch, single-instruction multiple-data architecture 300 of the present invention uses the flag signals of flag lines 354 to apply a consensus rule. In the consensus rule of image processor 300, sequence controller 352 does not apply a conditionally executed instruction sequence to broadcast instruction line 356 unless flag lines 354 signal controller 352 that every execution datapath 358a–n requires the instruction sequence. This prevents the inefficiency which results when some execution datapaths 358a–n are wait-stated for the duration of a sequence which is not executed by some of the datapaths 358a–n.

Both mechanisms, conditional execution and execution masks, may be used to implement the conditional execution within image processor 300 when some but not all datapaths 358a–n require it. Of these two mechanisms, execution masks EM are more general (i.e., affects the entire datapath). The execution mask flag is appended to the normal set of local arithmetic condition code flags within each execution unit 360a–n. When an execution mask flag EM is set within an execution unit 360a–n and sequence controller 352 applies the conditional execution sequence to broadcast instruction line 356, each execution unit 360a–n having its execution mask flag set ignores the instructions.

The only exceptions to instructions being ignored by execution datapath 358a–n within image processor 300 when an execution mask flag EM is set are (1) an instruction which restores the state of the previous execution mask flag, and (2) those instructions which unconditionally modify the execution mask flag EM. These instructions are executed by all execution units 358a–n even if the execution mask flag EM within a datapath 358a–n is set. Thus, if the execution mask flag EM is set in a selected execution unit 360a–n, instructions from instruction sequence controller 352 are ignored by the selected execution unit 360a–n. It is then possible to encode a conditional thresholding program fragment within single-instruction multiple-data architecture image processor 300 using execution masks EM.

As previously described, each execution datapath 358a–n within single-instruction multiple-data image processor 300 is equipped with an execution unit memory 362a–n. Each execution unit 360a–n directly accesses its own execution unit memory 362a–n by way of a respective port 361a–n of image processor 300. Each port 361a–n is provided with both an A port and a B port. Different signals may be transmitted between each execution unit 360a–n and its execution unit memory 362a–n simultaneously by way of the A and B ports under the control of the program being executed within execution units 360a–n. It will be understood that this transfer by way of ports 361a–n is distinguished from transfers by way of ports 363a–n which are under the control of block transfer controller 368.

It will be understood that this type of access to local execution unit memories 362a–n by execution units 360a–n involves writing of pointers only. Thus, these operations are not actually random accessing of execution unit memories 362a–n. Block transfer controller 368 permits split phase transactions. These split phase transactions are completely independent of instruction sequence controller 352. Thus, block transfer controller 368 operates as a separate instruction engine or controller not directly controlled by instruction sequence controller 352. This allows efficient access to memory, for an instruction cache, for example, as further discussed below. Therefore, block transfer controller 368 minimizes idling or wait stating of execution datapaths 358a–n while waiting for instructions.

It will be understood by those skilled in the art that conventional image processing systems usually provide processor consistency in that instructions are executed in the order that they are requested from memory. It will also be understood that single-instruction multiple-data image processor 300 of the present invention is provided with weak processor consistency because block transfer controller 368, functioning as a separate instruction engine or controller, can cause certain memory read requests to pass other memory read requests.

Within single-instruction multiple-data architecture 300 there is provided a method to more efficiently read blocks of data from system memory 36 into execution unit memories 362a–n, and operate on the data within execution unit memories 362a–n by way of lines 340, 342, 344. In order to accomplish these more efficient block read and block write operations, single-instruction multiple-data image processor 300 is provided with block transfer instructions and block transfer architecture. These input/output operations within single-instruction multiple-data image processor 300 are handled by autonomous synchronous block transfer controller 368. It will be understood that these are the operations of peripheral component interface bus 26 of the present invention.

Block transfer controller 368 within single-instruction multiple-data image processor 300 allows the transfer of two-dimensional arrays which are conformably displaced. This allows a subblock of a large image to be copied in a single block operation for example. In general, using source and destination bit maps, conformably displaced blocks may be transferred even though they do not have the same aspect ratio or alignment in physical memory.

The specification for a block transfer operation initiated by a program within image processor 300 is a set of lists of individual block transfers. Each enabled execution datapath 358a–n builds a list of block transfer commands in its execution unit memory 362a–n. A single block transfer initiate instruction eventually leads to the processing of all block transfer commands from the lists of every enabled execution datapath 358a–n . In addition, up to two sets of lists of block transfers may be pending at any time.

Figure 4:
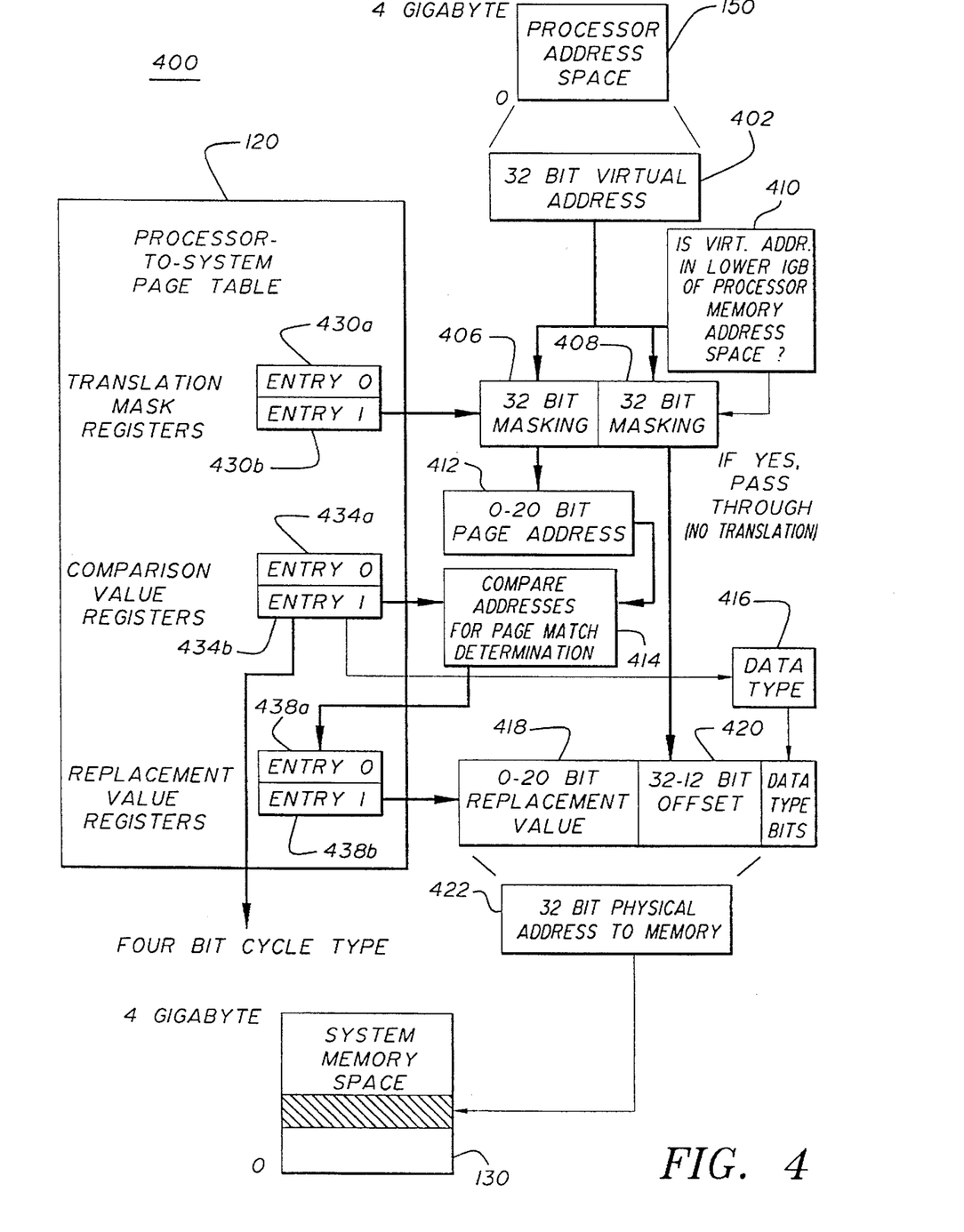
FIG. 4 is a processor memory address space to system virtual memory address space page translation algorithm for the apparatus of FIG. 1.

Referring now to FIG. 4, there is shown processor memory address space to system virtual address space page translation algorithm 400. Processor to system address space page translation algorithm 400 defines how two-bus interface system 10 translates thirty-two bit virtual address 402 generated by system processor 12 into a thirty-two bit virtual address which is effective to access system virtual address space 130.

During the address phase of a bus cycle, thirty-two bit virtual address 402 from block transfer controller 368 is latched internally within image processor 300. Virtual address 402 may be generated by microcode within image processor 300 or by a direct memory access. If virtual address 402 is in the lower one gigabyte of processor memory address space 150, as determined by comparison determination 410, the access is to local memory 24 and no address translation is required. If the address is greater than one gigabyte, as determined by comparison determination 410, it must be translated using page translation algorithm 400.

The translation of system processor 12 generates addresses greater than one gigabyte as follows. In block 406 of page translation algorithm 400, a programmable mask residing within a selected twenty bit processor-to-system address translation mask register 430a, b is used to partition thirty-two bit virtual address 402. Two or more programmable masks within mask registers 430a, b are provided for this purpose within programmable processor-to-system space page translation table 120. Masks within mask registers 430a, b, denoted as Entry 0 and Entry 1 within page translation table 120, are effective to partition virtual address 402 into a variable sized virtual page address 412 of zero to twenty bits, and a variable sized offset 420 of twelve to thirty-two bits. This allows windows with sizes of four kilobytes to one gigabyte to be opened. The sizes of the windows are powers of $2^x$, where x is a positive integer.

A comparison between variable page address 412, formed by a selected mask within mask registers 430a, b, and a corresponding comparison value within comparison registers 434a, b is performed by page translation algorithm 400 at the page match comparison determination 414. Comparison values of registers 434a, b within page translation table 120 are denoted as Entry 0 and Entry 1. When page address 412 results from partition by the mask residing in mask register 430a, the comparison is performed using the comparison value residing in register 434a. When virtual page address 412 results from partition by the mask residing in mask register 430b, the comparison is performed using the comparison value residing in comparison register 434b. The comparisons are made between page address 412 and the contents of successive comparison registers 434a, b until either a match is found or the entire contents of comparison registers 434a, b have been compared with page address 412.

If a bit in a selected mask register 430a, b is one, a bit in corresponding comparison register 434a, b is compared with the corresponding bit of virtual page address 412. If the bit in the selected mask register 430a, b is zero, the corresponding bit of virtual page address 412 is not compared to a bit in the corresponding comparison register 434a, b. A match is found when all of the compared bits of virtual page address 412 match the corresponding bits of the comparison values of registers 434a, b.

If a match is found, zero to twenty bit replacement value 418 is used to replace page address 418 and, thereby, at least a portion of the upper zero to twenty bits (31:12) of original virtual address 402. It will be understood that the notation (31:12) indicates a twenty bit portion of a thirty-two bit word which extends from bit thirty-one to bit twelve.

If the match is between page address 412 and the value of comparison register 434a, the programmable replacement value of replacement register 438a is used to provide replacement value 418. If a match is found between page address 412 and the value of comparison register 434b, the programmable replacement value of replacement register 438b is used to provide replacement value 418. In either case, virtual page address 412 is replaced with a value permitting access to an actual physical location within address space 130.

It will be understood that the programmable replacement values of replacement registers 438a, b correspond to programmable windows 122a, b of processor-to-system space page translation table 120. Modification of the values of replacement registers 438a, b permits the programmable mapping of virtual address 402 generated by image processor 300 into differing predetermined regions of system virtual address space 130.

Based upon the selected translation mask 430a, b, between thirty-two and twelve bits of variable sized offset 420 are partitioned from virtual address 402 for concatenation with replacement value 418, as previously described; in this manner, variable sized offset 20 is concatenated with replacement value 418 to form physical address 422 within one of the regions of system virtual address space 130 mapped by map windows 122a, b. Address 422 is the actual physical address of the location accessed by system processor 12. Physical address 422 may undergo a further translation which converts physical address 422 to a row and column address needed to access a selected system device in accordance with datatype bits 416 as described in more detail hereinbelow.

If no match with page address 412 is found, page address 412 is not used, and no access of buses 14, 26 is performed in response to virtual address 402. If page address 412 matches more than one comparison value in comparison registers 434a, b, the first comparison value which matches is used to determine a selected replacement register 438a, b and thereby to determine replacement value 418. A program implementing the page translation of algorithm 400 is shown in Table 1. The page translation program of Table 1 is in a form which will be understood by those skilled in the art.

TABLE I

```
/* For all bits in each register */
for (j=0; j<=1; j++)
    /* Determine page size and offset size
        if (ADDRESS<1 GIGABYTE) then
            PHYSADDR = ADDRESS;
            Break
    };
    /* Determine page size and offset size*/
    VPAGEADDR = (BSTLME[j] AND ADDRESS)
    OFFSET = ((NOT BSTLME[j]) AND ADDRESS)
    TEMP = 0x00000000;
    for (i=12; i<=31; i++) {
        /* Compare the compare register bit and the
            corresponding virtual page address bit */
        if (BSTLMC[j,i] = VPAGEADDR[i]) then
            TEMP[i] = 1 else TEMP[I] = 0;
    }
    /* If match is found, then assemble the physical
        address and exit */
    if (TEMP = 0xffffffooo) then {
        PHYSADDR = (BSTLMR[j,31:0]) OR OFFSET;
        MATCH++;
            Break;
        /*If BE window, append data type */
        if BLTSMCO-I[j,11] = BE then PHYSADDR [1:0] =
        DATAtype CYCLETYPE = BSTLMC [j,9:6]
}
if (MATCH=0) then {
    PAGE TABLE FAULT
    Clear all requests
}
```

Figure 5:
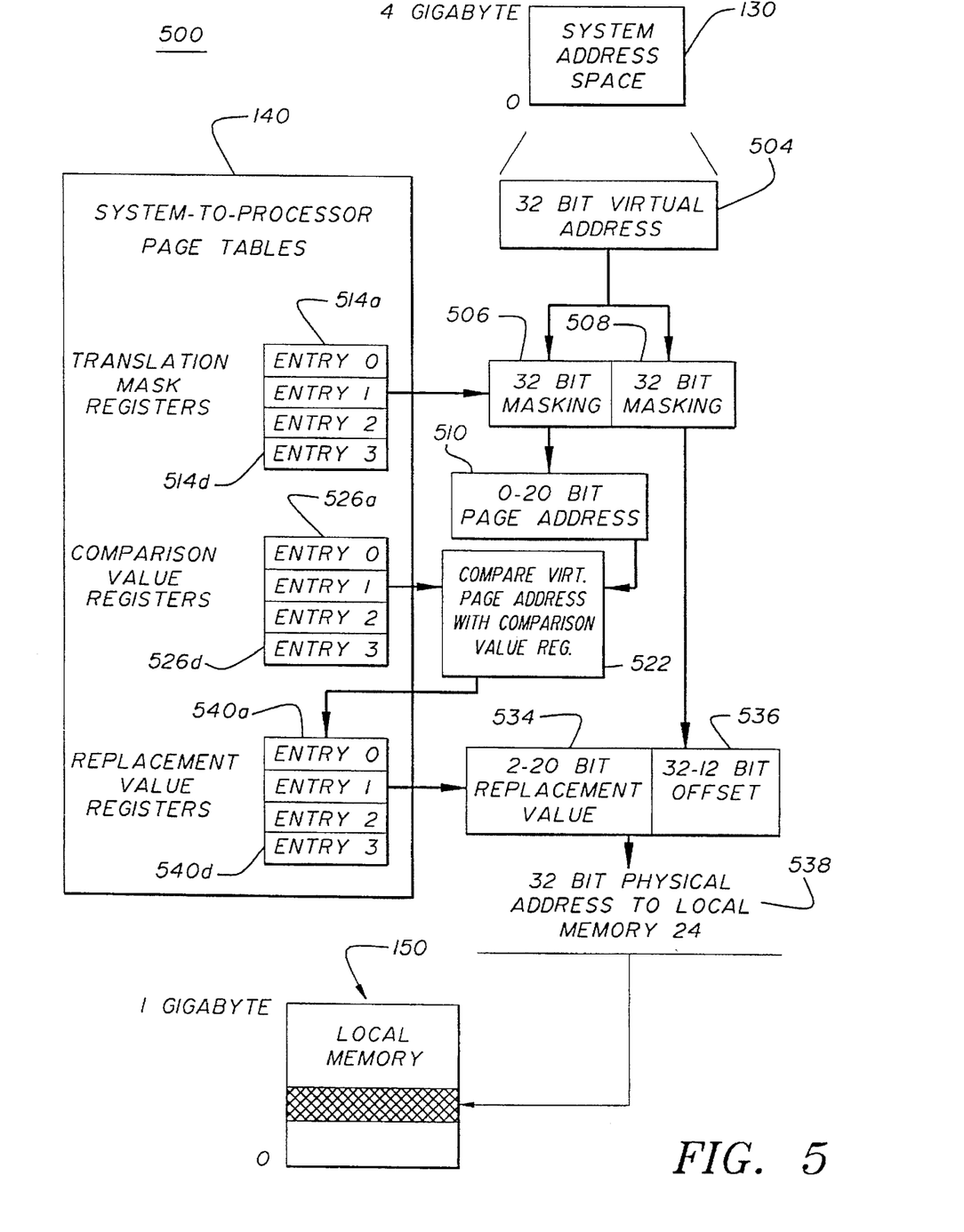
FIG. 5 shows a system virtual address space to processor address space page translation algorithm for the apparatus of FIG. 1.

Referring now to FIG. 5, there is shown system-to-processor space page translation algorithm 500 for translating the system generated virtual addresses from system virtual address space 130 into addresses within local memory partitions 102, 104 of processor memory address space 150. Thus, page translation algorithm 500 substantially performs the operations of system-to-processor space translation table 140 of memory model 100.

When implementing page translation algorithm 500, two-bus interface system 10 causes thirty-two bit virtual address 504 to be latched within image processor 300. In masking block 506 of page translation algorithm 500, a selected programmable twenty bit translation mask residing within translation mask registers 514a–d is applied to latched virtual address 504. The selected translation mask is effective to partition virtual address 504 into variable-sized virtual page address 510 and variable sized offset 536. The programmable translation masks within translation mask registers 514a–d of system-to-processor address space page translation table 140 are denoted as Entries 0, 1, 2, 3.

In this manner, virtual address 504 is partitioned into variable sized virtual page address 510 of zero to twenty bits and variable sized offset 536 within page translation algorithm 500 as previously described. Variable sized offset 536 is between thirty-two and twelve bits. This allows window sizes of four kilobytes to one gigabyte, in powers of $2^x$, where x is a positive integer, to be opened within interface system 10.

A selected comparison value within comparison registers 526a–d is compared with virtual page address 510 at page match comparison 522. If a bit in the selected translation mask of translation mask registers 514a–d has a value of one, the corresponding bit in comparison registers 526a–d is compared with the corresponding bit in virtual page address 510. If the bit in the selected translation mask register 514a–d has a value of zero, the corresponding bit of virtual page address 510 is not compared to the bit in comparison registers 526a–d. A match is found when all of the compared bits of virtual page address 510 match the corresponding bits in corresponding comparison register 526a–d.

If a match is found within page translation algorithm 500 at page match comparison 522, a zero to twenty bit replacement value in a replacement register 540a–d is selected. The replacement value selected in this manner replaces virtual page address 510 and, thereby, the upper zero to twenty bits of original virtual address 504. In this manner the virtual addresses generated by devices within system virtual address space 130 are replaced with bits representing the actual address to be accessed within processor memory address space 150. Based upon the translation mask value of selected mask register 514a–d, between thirty-two bits and twelve bits of variable-sized offset 536 are concatenated to replacement value 534 in order to form physical address 538.

This concatenation of replacement value 534 and variable-sized offset 536 produces physical address 538 at which the addressed data may be accessed within processor memory partitions 102, 104. It will be understood that this process permits processor 40 (see FIG. 1), for example, to access local memory 24 without interrupting image processor 300 (see FIG. 3). The access of local memory 24 in this case may be by way of block transfer controller 368 which handles the access independently of execution units 360a–n.

If no match is found, at page match comparison 522 a page table fault interrupt is generated within two-bus interface system 10 of the present invention. In response to the page table fault, virtual address 504 is not used by image processor 300 and all posted operations of block transfer controller 368 and any scheduled direct memory access operations are terminated. New requests are accepted within image processor 300, for example, to load an interrupt service routine or a trap.

If virtual page address 510 matches the contents of more than one comparison register 526a–d, the first page table entry for which a match is found is used to select replacement value 534 for concatenation with variable sized offset 536. A program implementing the page translation of algorithm 500 is shown in Table 2. The program of Table 2 is written in a form which will be understood by those skilled in the art.

TABLE 2

```
/* For all bits in each register */
for (j=0; J<=3;j++)
    /* Determine page size and offset size*/
    VPAGEADDR = (BSTLME[j] AND ADDRESS)
    OFFSET = ((NOT BSTLME[j]) AND ADDRESS)
    TEMP = 0x00000000;
    for (i=12; i<=31;i++) {
    /*Compare the compare register bit and the
        corresponding virtual page address bit */
        if (BSTLMC[j,i]) = VPAGEADDR(i]) then
            TEMP[i] = 1 else TEMP[I] = 0;
    }
    /* If match is found, then assemble the physical
    address and exit */
    if (TEMP=0xfffff000) then {
        PHYSADDR = (BSTLMR[j,31:0]) OR OFFSET;
        BREAK;
        }
}
```

Figure 6:
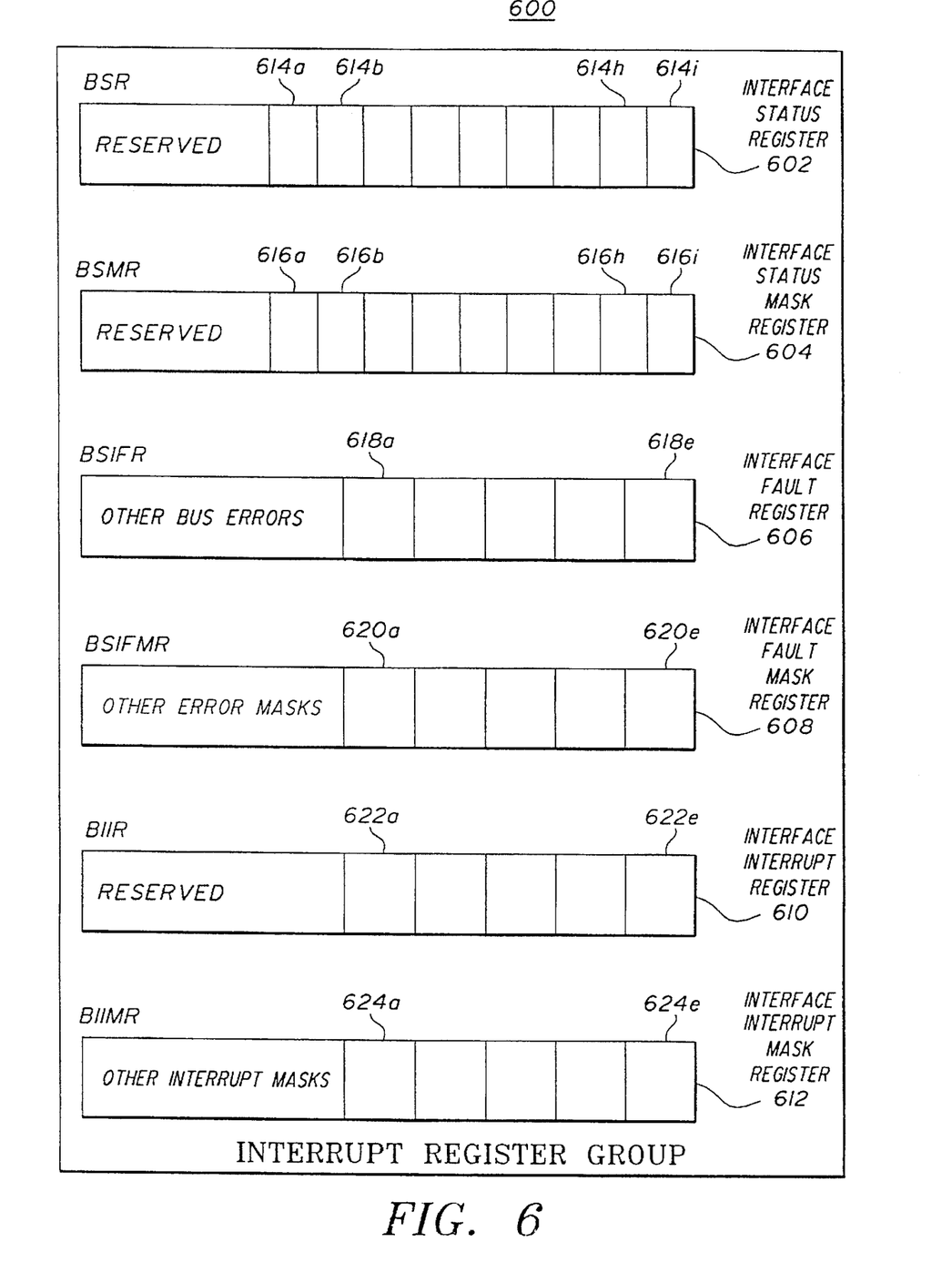
FIG. 6 shows a group of registers for controlling interrupts in the apparatus of FIG. 1.

Referring now to FIG. 6, there is shown interrupt register group 600 including interrupt control registers 602–612 for controlling errors and interrupts within two-bus interface system 10. Two-bus interface system 10 may be interrupted in at least three ways. A non-maskable interrupt may be asserted, a general interrupt may be asserted, or a write to an interrupt register may be performed. These three types of interrupts within interface system 10 are all controlled by interrupt control registers 602–612 within interrupt register group 600.

Interrupt control registers 602–612 are herein grouped together as interrupt register group 600 for convenience in describing the operation of the interrupt operations of two-bus interface system 10 of the present invention. However, it will be understood by those skilled in the art that interrupt control registers 602–612 may physically reside in differing locations within two-bus interface system 10.

Bus interface status register 602 of interrupt register group 600 includes register fields 614a–i. Transfer register field 614a of interface status register 602 is used to indicate an attempted VRAM transfer cycle to a bank of memory containing DRAM. Page translation fault field 614b may be set to a value of one to indicate the occurrence of a translation error during a system processor 12 initiated transfer to system memory 36 by way of peripheral component interface bus 26 and system memory interface 28. Direct memory access (DMA) register fields 614c, d may indicate that the start of a direct memory access transaction to system memory 36 is not directed to a valid map window 122a, b within page translation table 120.

Figure 7:
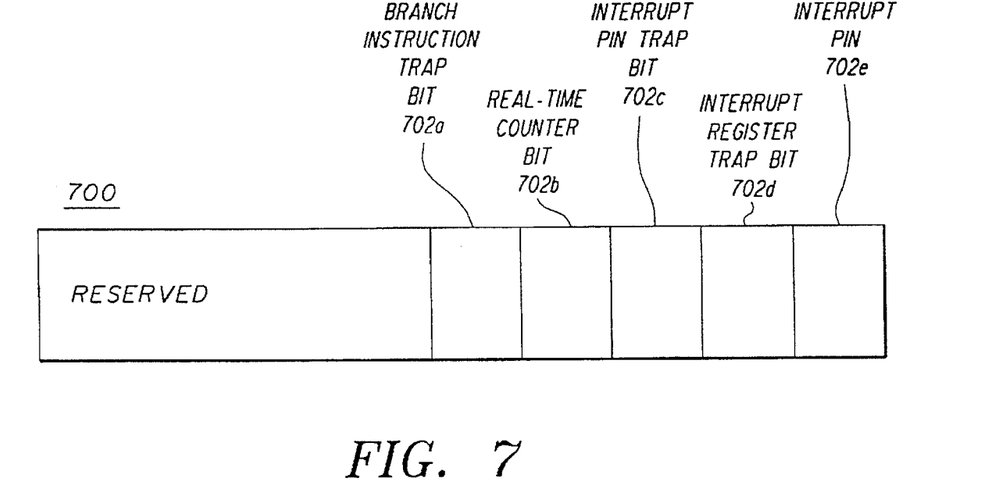
FIG. 7 shows the trap status register of the apparatus of FIG. 1.

Direct memory access transfer completion information, as well as direct memory access or page table fault information, are also stored in bus interface status register 602. This information is used in connection with bus interface status mask register 604, communicated to instruction sequence controller 352 and latched into trap status register 700 which is described hereinbelow. For this purpose, register fields 614e, f of interface status register 602 may indicate that a direct memory access operation has completed a scheduled transaction.

Processor interrupt field 614g indicates that system processor 12 itself has initiated an interrupt within two-bus interface system 10. The signal of processor interrupt field 614g of interface status register 602 may be logically AND'ed with interrupt mask field 616g of bus interface status mask register 604. The structure and function of bus interface status mask register 604 are described hereinbelow. The result of this logical AND operation may be outputted from system processor 12 to provide an external signal indicating that system processor 12 has initiated an interrupt according to the corresponding mask bit. Register fields 614h, i may be used to monitor overall system processor 12 performance as well as input/output operations for purposes of synchronization.

Interface status mask register 604 contains register fields 616a–i. Register fields 616a, b may contain, for example, masks for a transfer error interrupt and for a page translation fault. Register fields 616c, d contain masks for direct memory access error interrupts. Register fields 616e, f contain masks for direct memory access interrupts. Register field 616g contains the mask bit for processor interrupt field 614g of interface status register 602 as previously described. In a similar manner, register fields 618a–e of bus system interface fault register 606 may contain indications of a variety of system interface bus error conditions.

Register fields 620a–e of bus system interface fault mask register 608 may contain system interface bus error condition mask bits for a variety of sources. Bus interface interrupt register 610 may have thirty-two bits which serve as system interrupt registers. These bits within bus interface interrupt register 610 are reset when register 610 is read. Bus cycle errors are stored in bus system interface fault mask register 608. Register 608 is used in connection with bus system interface fault register 606 and its content communicated to instruction sequence controller 352 and latched into trap status register 700.

Thirty-two bit bus interface interrupt register 610 may reside in system memory interface 28 in order to be accessible to devices in interface system 10 such as system memory 36, processor 40 and memory mapped device 44. A read of bus interface interrupt register 610 by image processor 300 resets all of the bits of interrupt register 610 to zero. Bus interface interrupt mask register 612 provides thirty-two mask bits within interrupt register group 600. Each bit of thirty-two bit bus interface interrupt mask register 612 corresponds to and provides a mask for a bit in bus interface interrupt register 610.

Referring now to FIG. 7, there is shown trap status register 700 within single-instruction multiple-data architecture image processor 300. The errors and exception conditions in bus interface status register 602 and bus system interrupt fault register 606 may be represented by assigned trap bits within trap status register 700. Thus, the status of various traps of two-line interface system 10 may be determined by image processor 300 by performing logical operations upon selected bits of trap status register 700. Based upon these determinations, execution may be directed to one or more of a number of routines adapted for handling specific errors and exception conditions. These special service routines are described in more detail hereinbelow.

For this purpose, a signal is sent to sequence controller 352 and a signal is latched within trap status register 700 when predetermined interrupt bits within interrupt register group 600 are active and unmasked. The interrupt trap handler may then read bus interface interrupt register 610 to determine which device generated the interrupt. Trap status register 700 may be loaded, stored, tested and modified by execution unit 360a of single-instruction multiple-data architecture image processor 300 under program control in the preferred embodiment of two-bus interface system 10. The modification of trap status register 700 by image processor 300 may be a bit-by-bit clear performed by an interrupt service routine.

Examples of the uses of the bits of trap status register 700 are as follows. Branch instruction trap bit 702a may be generated when an unconditional jump is executed or when a conditional branch is taken within image processor 300. Real time counter bit 702b nay be generated when a real time counter reaches zero. Interrupt pin trap bit 702c may be generated by a high level interrupt on an external interrupt pin and interrupt register trap 702d may be generated when a write is performed to interrupt input register 610 in order to permit multiple interrupts.

Interrupt pin 702e provides an advantageous feature within trap status register 700 because it is a trap type bit which is level sensitive. Level sensitive bit 702e within trap status register 700 permits several different interrupt sources to be vectored onto, i.e., combined to produce, a single trap bit. The remaining bits of trap status register 700 may capture various trap requests and hold them active in the manner of a conventional latch. Thus, an interrupt may be detected by image processor 300 after the source which generated the request is inactive. The trap handler may execute an interrupt acknowledge cycle by sending the appropriate cycle code in processor-to-system space page translation table 120.

Exception conditions detected in programs or external interrupts usually require special service routines as previously described. These routines, in general, are not local to an instruction cache. Under these conditions, the instruction about to be executed is aborted and execution is transferred to a programmer-defined trap handler located at a predetermined address in local memory 24. The trap handler identifies the source of the trap and executes the required trap service routine. Once the trap handler has serviced a trap, the aborted instruction is restarted and normal execution is resumed.

There are several mechanisms that may cause invocation of the trap handler within two-bus interface system 10. Interface system 10 provides software trap instructions which may be used to set user defined breakpoint conditions. External conditions such as interrupts, non-maskable interrupts and assertion of a reset also generate traps. Finally, anomalies in the normal processing sequence, such as page table faults, invoke the trap handler.

A trap may be generated using an external interrupt pin, when, for example, processor 40 (see FIG. 1) writes to register 610. As previously described, this pin may be level sensitive. Using a level to indicate an interrupt allows several interrupt sources to vector to the same trap handling routine. Image processor 300 may interrogate each device throughout system virtual address space 130 or generate an interrupt acknowledge cycle to determine which is the requesting device.

Additionally, there are software initiated traps. For example, a single set trap occurs when a predetermined bit of the trap status register 700 is set to one by the microcode of image processor 300. In a similar manner, branch instruction traps, reserved instruction traps, and instruction traps may all be initiated by the execution of an instruction. The reserved instruction trap may be serviced by image processor 300 causing the trapped instruction to be read from address space 130 into execution unit memory 362a–n where it may be analyzed and emulated under program control. All of these traps are maskable and the instruction trap is always enabled.

Additionally, when a real time counter reaches zero, the frame counter is incremented by one, and when direct memory access transfers are completed, a maskable trap is initiated. Also, when there is no match in page translation tables 120, 140 during an input/output access, a system bus cycle error occurs or a bus interface fault trap is generated and a trap is initiated.

Information as to the state of image processor 300 which must be saved by the trap handler is application dependent. For example, if an arithmetic logic unit (ALU) of an execution unit 360a–n is used by the trap handler then, in general, the contents of the arithmetic logic unit (ALU) must be stored along with the contents of various other registers which are passed through the ALU. When execution returns from the trap handler, the process is reversed. The ALU is loaded by passing the data through one of the other registers. Thereafter, the contents of any latches which were saved are restored. Thus, the extent to which information as to the state of image processor 300 must be saved will vary with the type of trap being serviced.

Once a trap condition has been met within image processor 300, a bit in trap status register 700 is set. one exception to this is the reset wherein a bit in trap status register 700 is not set. Note that the reset trap must be recognized by the trap handler because no unmasked trap types are active in trap status register 700. Trap status register 700 contains a bit for each of the different traps as well as a global enable bit (not shown). There is also a mask bit for each trap in a trap mask register, which allows each of the traps of register 700 to be individually masked out.

Except for the non-maskable traps such as reset and the non-maskable interrupt, the initiation of a trap within two-bus interface system 10 depends upon two conditions: (1) the corresponding mask bit for the trap in the trap mask register must be set to one, and (2) the traps of trap status register 700 must have been enabled by setting the enable bit in register 700. The exception to this is the instruction trap which is not affected by the enable bit.

Trap handler invocation, excluding reset and the non-maskable interrupt, is performed as follows. When an unmasked trap is initiated, the enable bit of trap status register 700 is set to zero to disable further traps during servicing. The program counter address at which the program will later be restarted is stored. The initial trap handler instruction is fetched and multiplier registers of execution units 360a–n are copied into a shadow register within each respective execution unit 360a–n.

The reset and non-maskable interrupt trap handler invocation is distinguished from the other traps in several respects. Reset is not stored in trap status register 700. All of the tags in an instruction cache are invalidated during these two invocations and various internal control states are initialized throughout image processor 300.

As is true of the other traps, when either of these two traps is invoked, the enable bit of trap mask register is set to zero to disable traps. The program counter address at which the program will later be restarted is stored. The initial trap handler instruction is fetched. The multiplier register is copied into a shadow register in each execution unit 360a–n.

Prior to exiting the trap handler, a user of interface system 10 must insure that the state of image processor 300 is restored. The extent of the restoration required varies depending on the application. Once the state of image processor 300 is restored, the return from trap instruction is executed. The return from trap instruction returns program execution of execution units 360a–n of image processor 300 to the address stored as the address of the instruction which was next in line for execution when the trap handler was entered. It also sets the enable bit of trap status register 700 to one in order to reenable the traps, and restores the state of the multiplier.

The following steps illustrate the sequence of events in the handling of a trap.

```
Enter Trap
Save machine state to external memory
Check for what kind of interrupt
Do interrupt specific service routine
User restores the state of the TMR
  register
User restores the rest of V3 state
Execute tret/*TRET now enables TMR EN
  register and does seq return */
Exit trap
```

Figure 8A:
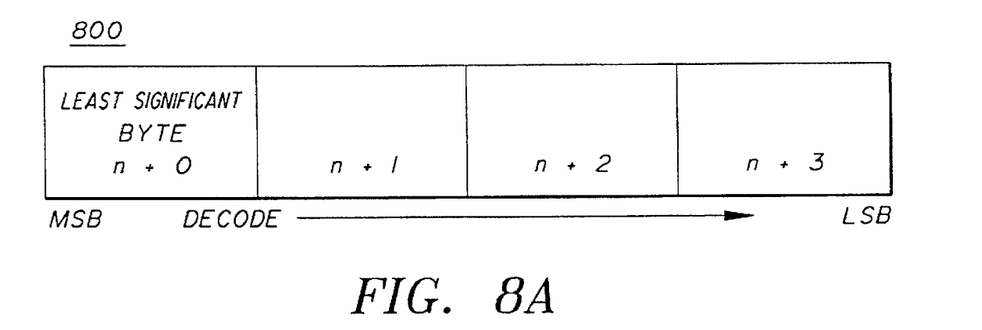
FIGS. 8A and 8B show two data formats permitted within the apparatus of FIG. 1.
Figure 8B:
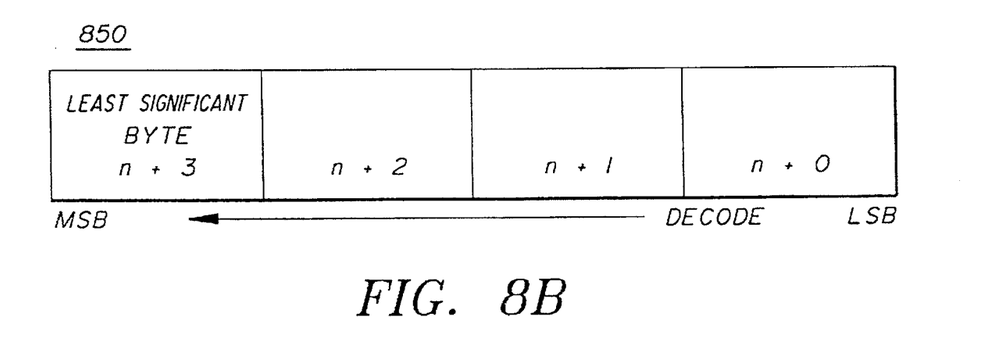

Referring now to FIGS. 8A, B, there are shown data format 800 and data format 850 which are permitted within two-bus interface system 10. In view of the direction in which they are accessed, these two data formats may be described as: (1) most significant bit to least significant bit data format 800 and (2) least significant bit to most significant byte data format 850. In data format 800, decoding starts at the most significant bit of the least significant byte of a thirty-two bit word. In data format 850, decoding starts at the least significant bit of the least significant byte. Thus, it will be understood that data within two-bus interface system 10 must be arranged in different ways depending on whether it is in data format 800 or data format 850.

Two-bus interface system 10 always operates internally on data which is in data format 850. Furthermore, interface system 10 assumes that data within local memory 24 is stored in data format 850. However, in some system configurations, single-instruction multiple-data architecture image processor 300 must access data from system devices in system address space 130, for example processor 40 and local memory 42 (see FIG. 1), which may use data which is in data format 800. The method of the present invention for implementing such accesses within two-bus interface system 10 assumes: (1) that incompatibility between a device using data format 800 and a device using data format 850 arises when data in data format 800 is interpreted by a device using data format 850, (2) that incompatibility between such devices arises when data in data format 850 is interpreted by a device using data format 800, and (3) that incompatibility does not arise when data in either data format 800 or in data format 850 are merely moved from one location to another within two-bus interface system 10.

For example, there are mechanisms in the translation from system virtual address space 130 to processor memory address space 150 to control the format of the data stored in system memory 36. When data is stored by image processor 300 by way of programmable map windows 122a, b into system virtual address space 130, system 10 provides datatype bits 416 representing the datatype information of the transaction coincident with the data. These datatype bits 416 are stored in comparison registers 434a, b within page table 120 and are provided during execution of page translation algorithm 400. These bits of comparison registers 434a, b may indicate whether data in the referenced page is in data format 800 or data format 850. Datatype information bits 416 are concatenated with replacement value 418 and offset 420 to form address 422.

The datatype information represented by datatype bits 416 is obtained from two sources in addresses generated by system processor 12. For microcode generated accesses, such as operations performed by block transfer controller 368, the datatype information is obtained from the block template or the scalar type, as programmed by the user. For direct memory access, the datatype information is provided from the direct memory access template. In all configurations of two-bus interface system 10 which share data between image processor 300 and devices using data format 800, datatype information is included along with all data transfers. The datatype information may be used by external logic (not shown) to perform conversions between data formats 800, 850. This logic may be included in any bus translation logic which may be provided to couple devices using data format 800 to peripheral component interface bus 26 which operates in data format 850.

Figure 9:
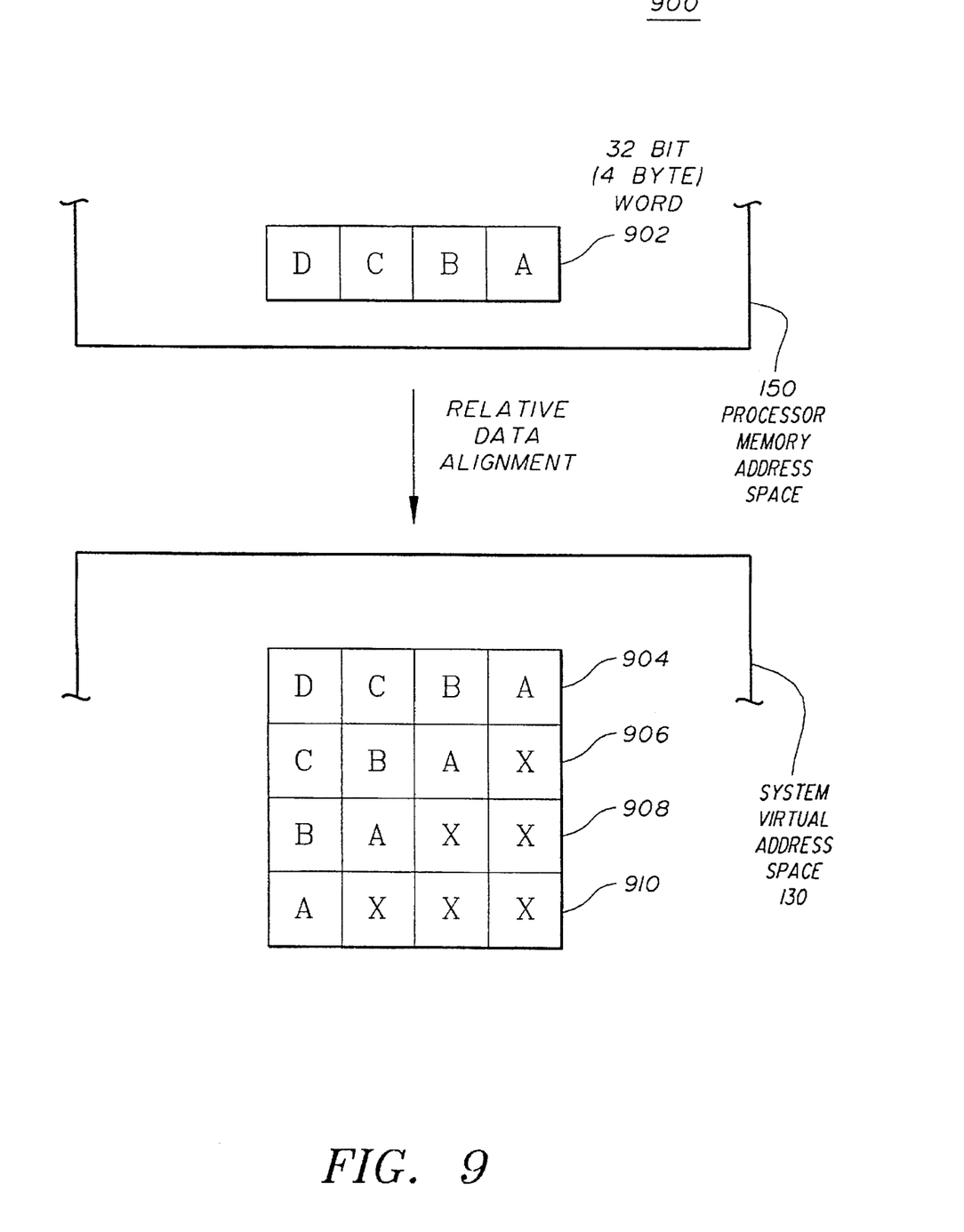
FIG. 9 shows a memory diagram illustrating possible alignments of data transferred from the processor to the system memory of the apparatus of FIG. 1.

Referring now to FIG. 9, there is shown memory diagram 900. Memory diagram 900 illustrates the possible relative alignments of thirty-two bit data words in system virtual address space 130 and processor memory address space 150. Thirty-two bit word 902 in processor memory address space 150, for example, may be aligned four different ways with respect to thirty-two bit words in system virtual address space 130. For example, it may be transferred without any offset of the eight bit bytes A, B, C, D as shown in word 904. However, there may be a one byte offset, a two byte offset, or a three byte offset as shown in words 906, 908, 910, respectively, within system virtual address space 130.

Two-bus interface system 10 automatically aligns data transferred from a system resource, such as local memory 42, to a local resource such as local memory 24, as well as data transferred from a local resource to a system resource aligned to the data type. This ability to write unaligned data and have it automatically aligned, for example by external hardware as previously described, makes more efficient use of interfaces 16, 28. The bits indicating the relative alignment may be stored and determined within registers of two-bus interface system 10 in a manner similar to that previously described for indicating datatypes and other information, for example, it may be stored within processor 300 or interfaces 16, 28. However, it will be understood that this information may also be stored and determined by other methods known to those skilled in the art.

For example, in an alternate embodiment, information with respect to automatic alignment may be transmitted, for example, within data type field 416 within algorithm 400. The datatype information stored in tables 434a, b may thus be selected by the user according to the source and the destination, thereby providing the information required for automatic alignment. Thus, using the bits of field 416, it is possible to determine the alignment and to transfer data with the proper offset according to the destination indicated by, for example, page address 412. In the preferred embodiment of the invention, the bits of data type field 416 are transmitted by way of sideband or reserved signal lines of the bus protocol.

It will be understood that this information is available within, for example, processor-to-system page translation table 120 during the execution of algorithm 400. Note that determining these bits requires comparison of both the source and the destination addresses to determine the amount of offset.

It will be understood that various changes in the details, materials and arrangements of the parts which have been described and illustrated in order to explain the nature of this invention, ray be made by those skilled in the art without departing from the principle and scope of the invention as expressed in the following claims.

We claim:

1. An apparatus for translating a first address in a first address space to a second address in a second address space, comprising:
   (a) a processor;
   (b) a page table having a translation mask register, a comparison value register, and a replacement value register; and
   (c) a comparator coupled to the comparison value register and to the replacement value register; wherein:
      the first address comprises a first subaddress comprising a subset of the bits of the first address and a second subaddress comprising remaining bits of the first address;
      the first subaddress masked with a mask value stored in the mask register is compared by the comparator with successive comparison values stored in the comparison value register until a match comparison value is found; and
      a replacement value in the replacement value register corresponding to the match comparison value is concatenated with the second subaddress to provide the second address.

2. The apparatus of claim 1, further comprising a processor address space comparator for comparing the first address to a processor address space threshold, wherein the second address is equal to the first address if the first address is less than the threshold.

3. The apparatus of claim 1, wherein, if the first subaddress masked with the mask value in the mask register matches more than one comparison value in the comparison value register, then the first of the comparison values that match is used to determine the replacement value that is concatenated with the second subaddress to provide the second address.

4. The apparatus of claim 1, wherein the first address space is a processor address space of the processor and the second address space is a system address space of a computer system with which the processor is associated.

5. The apparatus of claim 1, wherein:
   the first address and second address are 32-bit addresses; and
   the mask register stores 20-bit masks which partition the first address into the first subaddress and the second subaddress.

6. The apparatus of claim 5, wherein the first subaddress comprises a variable page address of 0 to 20 bits and the second subaddress comprises a variable offset of 12 to 32 bits.

7. The apparatus of claim 1, wherein:
   data having a data format is associated with the first address space;
   the comparison value register stores, for each of said successive comparison values, at least one data format type bit that indicates the data format of data associated with an address of the first address space that matches each successive comparison value; and
   the at least one data format type bit is concatenated with the replacement value in the replacement value register corresponding to the match comparison value and the second subaddress to provide the second address.

8. The apparatus of claim 7, wherein the data format is one of: a least significant bit to most significant bit format, and a most significant bit to least significant bit format.

9. A method for translating a first address in a first address space to a second address in a second address space, comprising the steps of:
   (a) providing a processor, a page table having a translation mask register, a comparison value register, and a replacement value register, and a comparator coupled to the comparison value register and to the replacement value register;
   (b) partitioning the first address into a first subaddress comprising a subset of the bits of the first address and a second subaddress comprising remaining bits of the first address;
   (c) comparing with the comparator the first subaddress masked with a mask value stored in the mask register with successive comparison values stored in the comparison value register until a match comparison value is found; and
   (d) concatenating a replacement value in the replacement value register corresponding to the match comparison value with the second subaddress to provide the second address.

10. The method of claim 9, further comprising the steps of:
    (e) comparing the first address to a processor address space threshold; and
    (f) if the first address is less than the threshold, then setting the second address equal to the first address.

11. The method of claim 9, wherein, if the first subaddress masked with the mask value in the mask register matches more than one comparison value in the comparison value register, then the first of the comparison values that match is used to determine the replacement value that is concatenated with the second subaddress to provide the second address.

12. The method of claim 9, wherein the first address space is a processor address space of the processor and the second address space is a system address space of a computer system with which the processor is associated.

13. The method of claim 9, wherein:

the first address and second address are 32-bit addresses; and the mask register stores 20-bit masks which partition the first address into the first subaddress and the second subaddress.

14. The method of claim 13, wherein the first subaddress comprises a variable page address of 0 to 20 bits and the second subaddress comprises a variable offset of 12 to 32 bits.

15. The method of claim 9, wherein:

data having a data format is associated with the first address space;

the comparison value register stores, for each of said successive comparison values, at least one data format type bit that indicates the data format of data associated with an address of the first address space that matches each successive comparison value; and the at least one data format type bit is concatenated with the replacement value in the replacement value register corresponding to the match comparison value and the second subaddress to provide the second address.

16. The method of claim 15, wherein the data format is one of: a least significant bit to most significant bit format, and a most significant bit to least significant bit format.

* * * * *